Aug. 18, 1959
J. H. EDMAN
2,900,030
MULTIPLE-FUNCTION IMPLEMENT CONTROL
SYSTEM FOR AGRICULTURAL TRACTOR
Filed Nov. 3, 1954
5 Sheets-Sheet 1
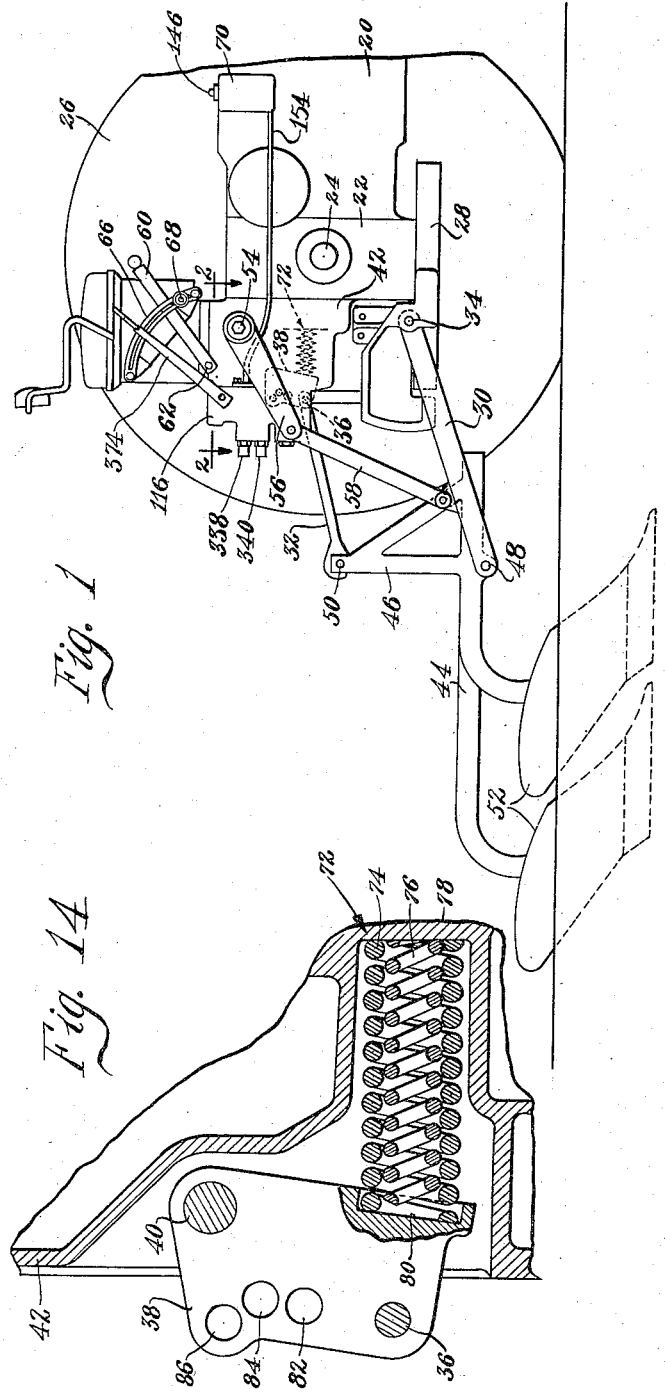
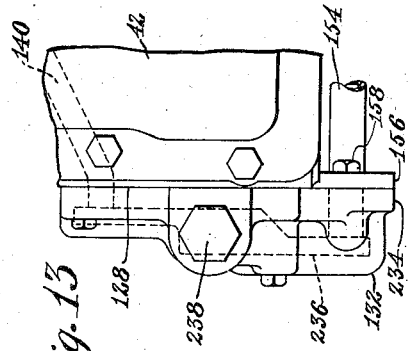
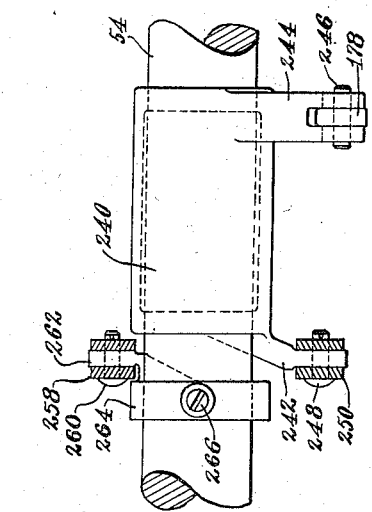
INVENTOR.
J.H.Edman

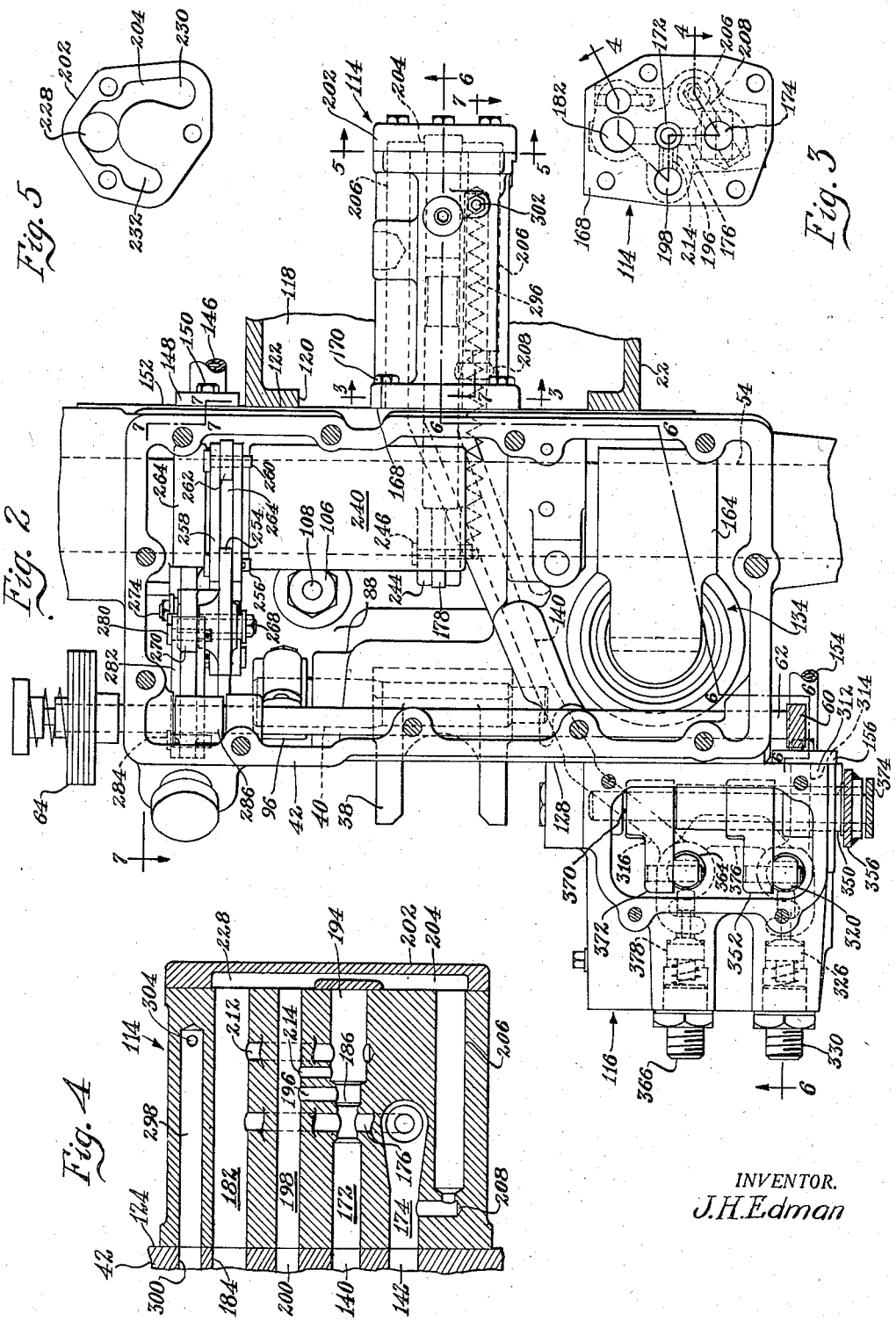

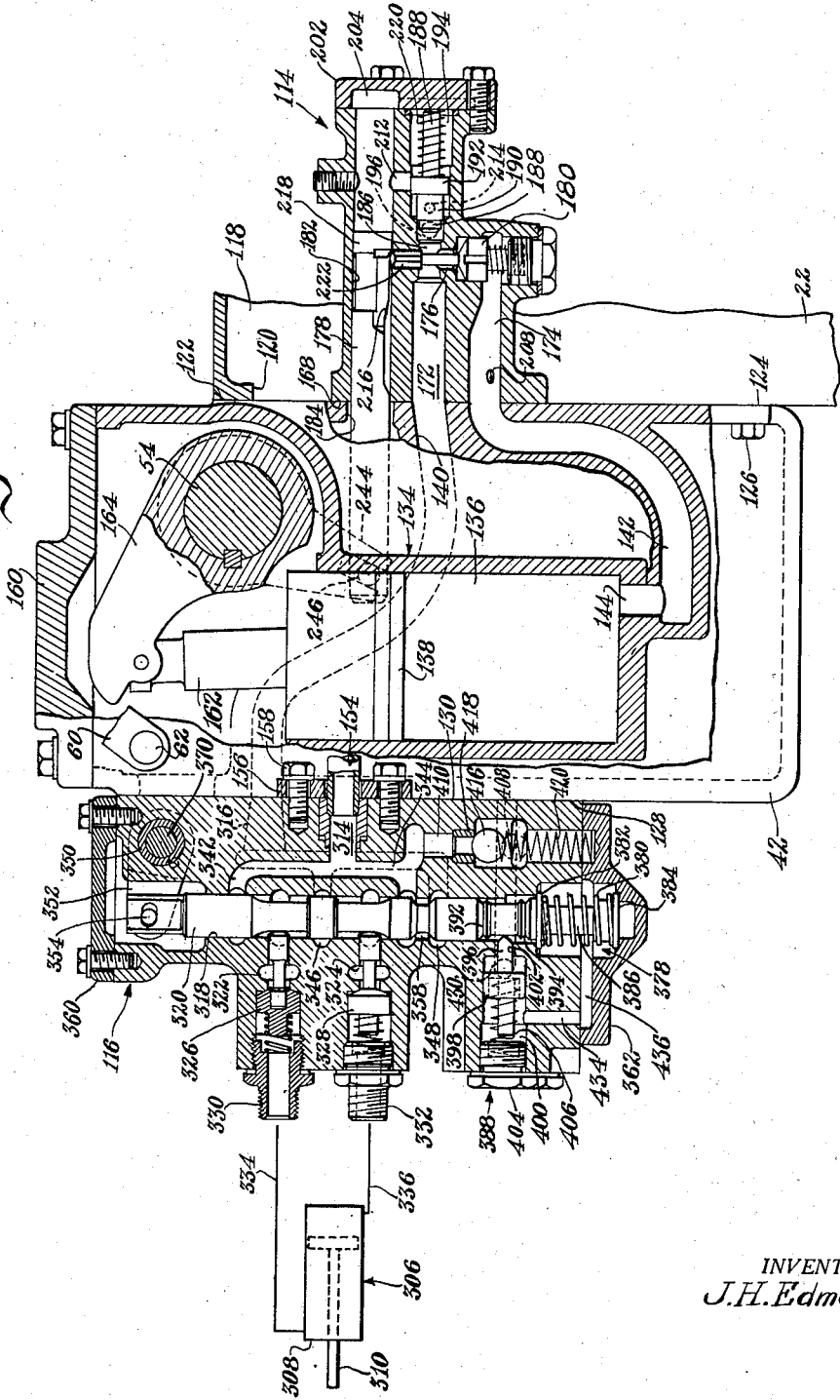

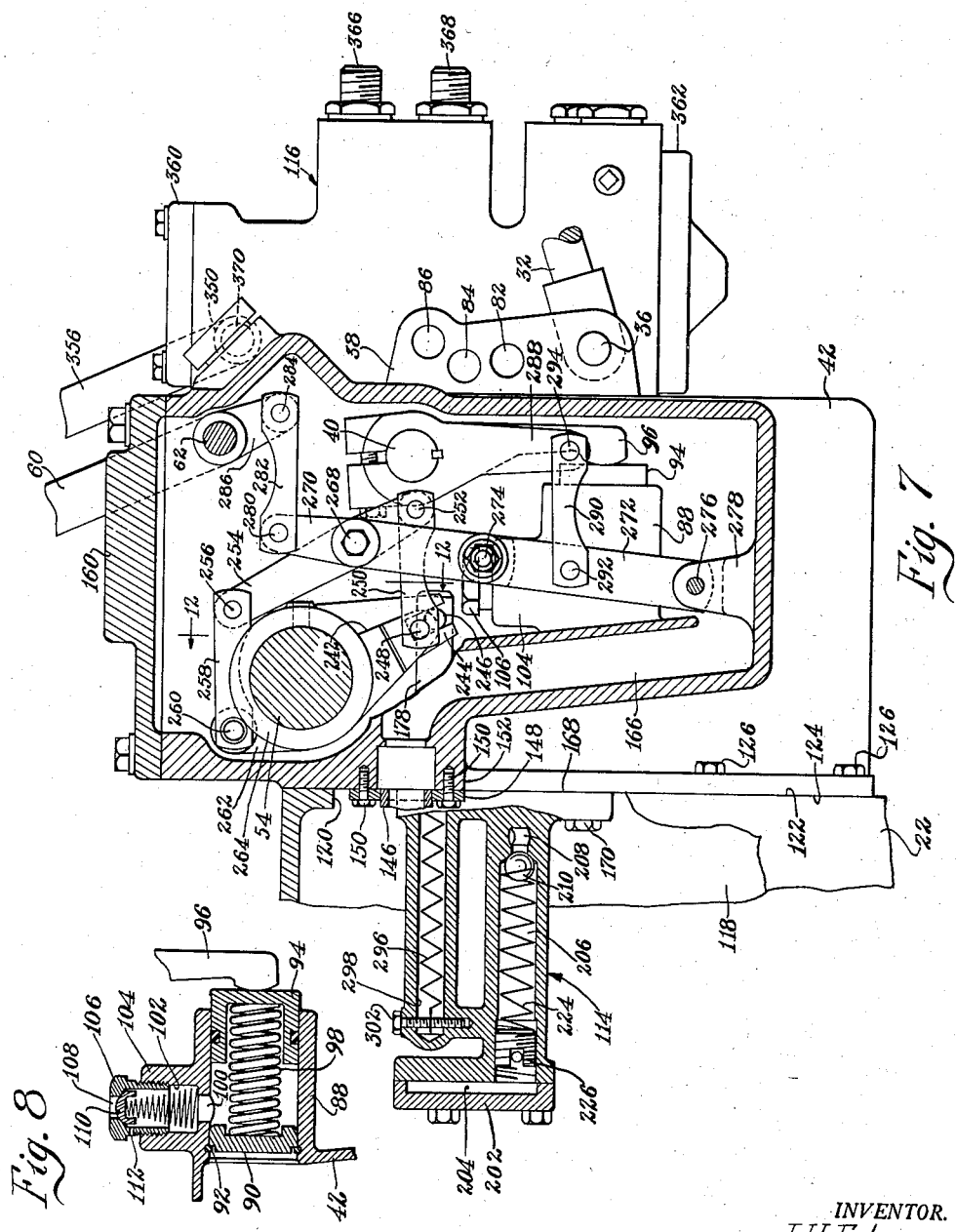

INVENTOR.
J. H. Edman

United States Patent Office 2,900,030
Patented Aug. 18, 1959

2,900,030

MULTIPLE-FUNCTION IMPLEMENT CONTROL SYSTEM FOR AGRICULTURAL TRACTOR

John H. Edman, Waterloo, Iowa, assignor, by mesne assignments, to Deere & Company, a corporation of Delaware Application November 3, 1954, Serial No. 466,649

10 Claims. (Cl. 172—9)

This invention relates to an agricultural tractor and more particularly to improvements in power means for controlling the operational relationships of implements used with the tractor.

A tractor-plow outfit will be selected as a specific example of an agricultural organization in which the invention finds particular utility; although, it will be appreciated that the invention has wider application. In conventional practice, the plow is draft-connected to the tractor for travel with the tractor over a field. During such travel, the draft forces exerted by the tractor on the plow will vary in accordance with variations in resistances opposing forward travel of the plow, which may occur because of differences in soil texture, obstacles in the soil, and the ability of the tractor to retain optimum traction. Conceivably, such resistance may occur in such magnitude as to cause the tractor to stall. An obvious solution is, of course, to utilize a tractor of greater power. However, in most instances this might result in a waste of power and would therefore be uneconomical. Another solution is to plow at a shallower depth, but this is not always feasible because the selected shallow depth may not be adequate.

A compromise solution is offered by what may be termed for convenience the load-control system, examples of which appear in the disclosures of such U.S. patents as Ferguson 1,687,719 and 2,118,180. The earlier patent discloses a mechanical system and the later patent discloses a hydraulic system. Since hydraulic systems have by far superseded mechanical systems, reference herein will be to the present invention in terms of its embodiment of hydraulic principles. However, the specific reference is only by way of example and is not intended to exclude other possibilities. Likewise, reference herein to draft forces as affected by soil conditions is explanatory only, since in instances other than those concerned with plows, cultivators and other ground-working tools, machines may very well encounter other agricultural resistances modifying a draft force or other equivalent working forces. Similarly, the vehicle-implement unit need not necessarily be a tractor and a drawn implement but may include a vehicle on which the implement is directly mounted or a vehicle on which the implement is forwardly mounted for propulsion by the tractor.

The fundamentals of any load-control system involve the draft-connection of an implement to a tractor (for example), together with hydraulic means for automatically raising and lowering the draft connection and thereby to change the plowing depth of the plow in accordance with the changes in draft forces imposed on the draft linkage by the implement as it encounters varying soil resistances of the nature outlined above. The draft linkage connection between the tractor and the implement includes a pivot on a transverse axis about which the plow may tilt forwardly and rearwardly respectively as the draft forces increase and decrease. Forces resulting from pivotal movement of the implement are transmitted to the tractor by means of a top or compression link incorporating biasing means in the form of a spring initially adjusted to balance a draft force of a predetermined value. When the draft force changes, the changes are reflected through the top link which in turn acts upon a valve controlling a fluid motor which adjusts the height of the draft linkage to change the position of the plow to a plowing depth at which the draft force will again equal the predetermined value. The value can be changed, of course, by a manual control which is connected to the control valve for initially setting the valve.

In any load-control or load-responsive system of the general character referred to above, the basic principle of operation is that some effect of the load (the plow in the selected example) is floated or balanced against a spring so that an increase in load will cause a significant increase in the deflection of the spring and, conversely, a decrease in load will result in a decrease in load-spring deflection. The deflection of the spring is, of course, in response to thrust forces developed in the top link and these thrust forces are used to adjust the valve. In some cases, the top link may be replaced by a tension link in which tensional forces are used to reflect the draft forces and accordingly to modify the working position of the implement. There is no known control valve capable of modifying fluid pressure to or from a fluid motor in response to an infinitesimal shift in position of the valve from its neutral position. Consequently, there is an inactive portion of valve movement before the necessary fluid flow is accomplished. Therefore, it is necessary that the valve movement be of an appreciable magnitude and for that reason movement of the control member (the top link in the selected example) must be amplified so as to secure the necessary movement of the valve.

It follows from the foregoing that the spring that is balanced against the draft forces should be deflected, in the average increase of load or draft force imposed on it, well within the limits of its movement. In an ideal situation, the spring might be compressed one half of the total permitted by mechanical considerations, thus leaving a reserve of movement in each direction for further increases and decreases in the load or draft. The range of thrust loads generated in the top link by the implement varies according to tractor and implement size, becoming increasingly relatively large as the tractor size is decreased. In order that a relatively large tractor, for example, may be used with certain types of implements in which the loads are relatively light, the control system must accommodate the possibility of light loads, and at the same time the tractor, because of its large size, must have a control system designed to accept heavy thrust forces in the top link generated by full-power operation of such ground-working tools as the subsoiler, for example. In any event, the spring must not be compressed solid. It is a feature of the present invention to solve the problem outlined above by the provision of a dual or compound spring arrangement comprising a pair of springs, one of which is relatively soft, to accommodate light loads, and the other of which is relatively stiff, to accommodate the heavier loads. The relationship of the springs between the tractor and the movable member that changes its position in response to changes in load is such that the light spring is immediately effective, whereas there is a lost-motion relationship between the parts so that the heavier or stiff spring does not become effective until subsequently. Therefore, draft forces generated by light loads are opposed or resisted exclusively by the light spring and heavier loads are resisted by both springs. This is in accordance with the improved sensitivity pattern of the control system as responsive to variation in draft loads.

Another characteristic of a load-responsive system is the tendency of the system to over-correct at times, particularly when increases in soil resistance, for example, are sudden but temporary, in which cases the top link is subject to shock loads which are immediately transmitted to the valve-control linkage. Since the nature of the obstacle or other resistance-forming factor in the soil may be only temporary, it is undesirable to effect an adjustment of the plow, since normally the tractor will have the ability to lug through the temporary increased resistance. According to the present invention, this result is achieved by the provision of shock-absorbing means, preferably in the form of a hydraulic dash-pot, for resisting transient displacement of the top link in response to temporary shock loads, the shock-adsorbing means functioning also to break up any natural frequency inherent in the use of the coil spring and also damping the oscillations arising from variations in soil resistance. This improvement contributes materially to the steadiness and smoothness of operation.

It is another object of the invention to combine the important advantages of a load-responsive system with those of what is known as a position-responsive system, wherein the position of the plow is determined solely by setting of the hand lever, a good example of which is disclosed in the U.S. patent to Worstell 2,477,710. When the two systems are combined, as in assignee's copending application Serial No. 258,231, filed November 26, 1951, now U.S. Pat. No. 2,721,508, the position of the valve changes in response to any one of the following: First, manual adjustment of the hand lever; second, movement of the follow-up linkage; third, variations in deflection of the spring in response to varying loads applied to it in accordance with changes in draft load. Although, as already evidenced here by reference to assignee's copending application, the advantages of coordinating the foregoing factors have already been appreciated and are therefore not broadly claimed here as being novel, it is nevertheless a feature of the present invention to improve the combined position-and-load-responsive system by utilizing specifically novel follow-up linkage in the environment noted. Still further, the improved linkage has special cooperation with the shock-absorbing means or dash-pot. And the shock-absorbing means is broadly important with any type of load-balance or load-resisting spring, albeit specifically applicable to the double-spring arrangement.

Still another object of the invention is the provision of novel hydraulically controlled detent means for selectively locking and releasing the control valve means in the external valve housing.

The foregoing and other desirable objects inherent in and encompassed by the invention will be apparent as a preferred embodiment of the invention is disclosed in detail in the following specification and accompanying sheets of drawings, the several figures of which will be described immediately below.

Fig. 1 is a representative side elevational view of the rear portion of a tractor and draft-connected plow, the near wheel of the tractor having been omitted in the interests of clarity.

Fig. 2 is an enlarged plan view, partly in section, of the power lift casing and housing arrangement as seen generally along the line 2—2 of Fig. 1.

Fig. 3 is a sectional view as seen along the line 3—3 of Fig. 2.

Fig. 4 is a "developed" sectional view as seen along the line 4—4 of Fig. 3.

Fig. 5 is a sectional view as seen along the line 5—5 of Fig. 2.

Fig. 6 is a longitudinal sectional view taken along the irregular line 6—6—6—6—6—6 of Fig. 2.

Fig. 7 is a view from the opposite side of Fig. 6, being partly in section along the irregular line 7—7—7—7—7—7 of Fig. 2.

Fig. 8 is a sectional view of the shock-absorbing means or dash-pot.

Fig. 12 is a fragmentary elevational view, partly in section, as seen along the line 12—12 of Fig. 7.

Fig. 13 is a fragmentary plan view of a portion of the power lift casing and housing arrangement, showing the substitution of a cover plate for the external valve housing.

Fig. 14 is a sectional view showing the dual spring arrangement.

Figure 11:
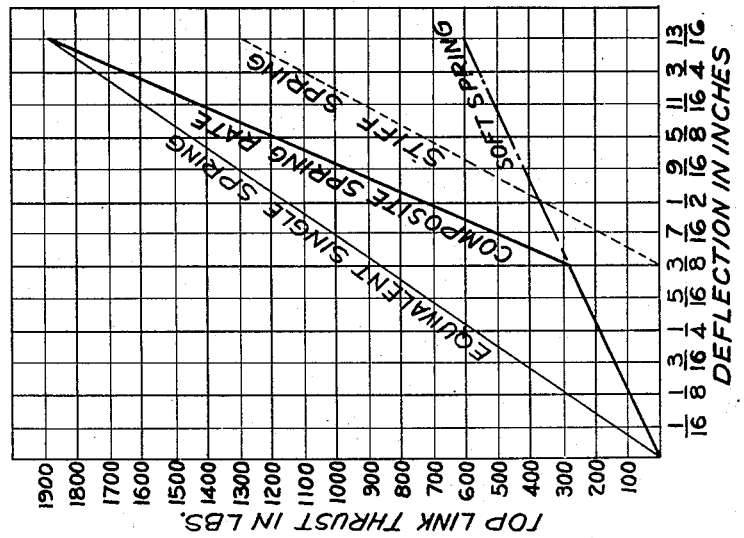
Fig. 11 is a graph showing the comparative results of different spring arrangements.

The rear end portion of a well known type of agricultural tractor will be recognized in Fig. 1 as having a rear relatively narrow body part 20, conventionally supported on transverse rear axle structure 22 from which transverse axles extend in opposite directions to mount traction wheels. In the present disclosure, only one such axle is shown at 24 and only one traction wheel appears at 26, the near or right-hand traction wheel having been removed to clarify the illustration.

The under portion of the axle housing 22 carries drawbar structure 28 and, in addition, the tractor is equipped with hitch or draft linkage comprising a pair of lower links 30 (only one of which is shown) and an upper or top link 32. The lower links are pivoted at their forward ends to the tractor at 34 and the top link 32 is pivotally connected at its forward end at 36 to a load- or draft-responsive yoke or control member 38, which is itself rockably mounted on the tractor by means of a short transverse rockshaft 40 journaled in a main power lift or power control casing 42 that is secured to the rear end of the tractor in a manner to be brought out in detail below.

The draft linkage 30—32 is utilized for the purpose of connecting various implements to the tractor. For the purposes of present illustration, the draft linkage serves to draft-connect to the tractor a trailing ground-working implement, here in the form of a two-bottom plow having longitudinal beam structure 44 and a forwardly located mast 46. The draft and top links are connected at their rear ends respectively to the beam structure 44 and to the mast 46 by pivot pins 48 and 50. The two plow bottoms, designated by the numeral 52, are shown as plowing at a substantially maximum depth, the long horizontal line in Fig. 1 representing the ground line.

Vertical adjustment of the draft linkage 30—32 for the purpose of varying the plowing depth is accomplished by means of a power lift or power control system contained in part in the casing 42. The details of this structure will be described later. For present purposes, it is deemed sufficient to explain that the power lift mechanism includes a transverse lifting member in the form of a rockshaft 54 to each end of which is keyed a rearwardly extending lift arm 56, only one of which is shown. Each lift arm 56 is connected to its corresponding draft link 30 by means of a lift link 58. Regulation of the power control system is by means of a manual control or hand lever 60, keyed at its lower end to a transverse control shaft 62 mounted in an upper portion of the main casing 42. The shaft 62 is equipped with friction means of any suitable type such as is designated generally by the numeral 64 in Fig. 2, which is utilized to create resistance to free rocking of the shaft 62 so as to afford settable positioning of the hand lever relative to an arcuately slotted control sector 66. Thus, any selected position of the lever 60 may be considered fixed; although, the condition may be forcibly changed. A selectively settable stop 68 is positionable in the sector 66 to establish an adjustable limit for forward positioning of the lever 60, all of which is generally conventional and requires no detailed explanation. The lever 60 controls the position of a valve, to be described below, which in turn controls the fluid-pressure-operated system or circuit including a pump 70 that is driven from any suitable source on the tractor.

In a straight or pure load-responsive system, the position of the lever 60 will initially determine the amount of valve opening which in turn will cause the rockshaft 54 to rock in a counterclockwise direction for lowering the draft linkage 30—32 until the plow bottoms 52 contact the ground. As the tractor moves forwardly, the plow bottoms will enter the ground and the ultimate depth thereof will be determined by the balance of draft forces against biasing means, designated generally by the numeral 72, acting on the yoke 38. That is to say, soil resistance to the plow bottoms 52 will vary the extent to which fore-and-aft forces are applied to the top link 32 and these forces result in the transmission of fore-and-aft movement to the control yoke 38 which is in turn opposed by the biasing means 72. When the soil resistance is relatively great, the forces in the top link 32 are in a forward direction and thus tend to rock the yoke 38 forwardly about its rockshaft 40; and, when a condition of substantial equilibrium is reached, the hydraulic control valve will be moved to neutral and theoretically the plow will continue to plow at a constant depth; but, when soil conditions vary, thus varying the draft forces between the plow and the tractor, the change will be reflected by movement of the yoke 38 in one direction or another, the biasing means 72 being compressed when the draft load increases and being extended when the draft load decreases, resulting in modification of the position of the hydraulic control valve so that equilibrium between the draft forces and the biasing means 70 is again achieved, accompanied by a consonant change in plowing depth. Since these fundamentals are covered in the above-identified Ferguson patents, as well as elsewhere, they are deemed to need no elaboration here.

From the foregoing description, it will be clear that draft or load is reflected in forward or rearward swinging of the load-control yoke 38 about its rockshaft 40. One of the features of the present invention resides in improvements in the biasing means 72. To that end, the biasing means illustrated here comprises a first or outer coil spring 74 and a second or inner coil spring 76. The outer spring, although of larger diameter than that of the inner spring, is a relatively low-rate or "soft" spring. The inner spring is relatively stiffer and has a higher rate. However, the positions of the springs could be reversed or otherwise modified. It will also be observed that although the inner or right-hand ends of both springs seat against an anchor portion 78 of the main casing 42, the outer or left-hand ends are arranged differently as respects each other and a pocket 80 in the yoke 38. The difference resides in the lost-motion arrangement as respects the inner spring 76. That is to say, whereas the left-hand end of the outer spring 74 is in direct contact with the pocket 80, there is initially a space between the pocket and the left-hand end of the inner spring 76. Because of the direct contact of both ends of the soft outer spring with the anchor 78 and pocket 80, the soft spring is immediately effective and movement of the draft-actuated member or yoke 38 in an initial range is opposed exclusively by the soft spring, and after the lost motion is taken up between the pocket 80 and the left-hand end of the inner and stiffer spring 76, movement of the member or yoke 38 in a range beyond the initial range is opposed by both springs. The arrangement thus provides for what may be termed "soft" operation with small loads and consequently small deflections of the yoke 38 in a forward direction. Therefore, the sensitivity of the system for small loads is many times greater than would be the case if a single constant-rate spring were used, because such single spring would have to be made stiff enough to accommodate heavier loads. In the present instance, the accommodation of heavier loads is afforded by the stiffer inner spring 76, which leaves the initial deflection of the soft outer spring 74 available for handling lighter loads. This is particularly important in view of the wide range of loads accommodated by the ordinary tractor. An example of this situation is afforded by recognizing the differences in loads imposed on the tractor by a cultivator and a subsoiler, assuming that the same tractor would be used at different times with these two implements. Consequently, the limitations on the range of performance obtainable with a single load-control spring are substantially reduced by use of the compound or double spring.

The features of the double or variable-rate spring arrangement are graphically illustrated in Fig. 11 and the legends thereon are self-explanatory. The lost-motion between the yoke pocket 80 and the stiff spring 76 is here on the order of ⅜", which appears on the graph as the departure of the "Composite Spring Rate" from a straight line at ⅜" spring deflection and about 290 lbs. load.

As a further refinement in the sensitivity pattern as respects adjustment of the hydraulic valve in response to variations in draft forces or load, the yoke 38, in addition to the pivot point 36, has a number—preferably three—of additional connecting points, represented here by additional openings 82, 84 and 86. The moment arm about the rockshaft pivot 40 may therefore be varied by connecting the top link 32 to any one of the other openings 82, 84 or 86, thus varying the ratio at which the thrust forces in the top link will be transferred to the biasing means 72.

Another feature of utility and importance in connection with the load-control characteristics of the present system is the shock-absorbing means for damping oscillations and vibrations in the draft control linkage. This means also serves to eliminate sporadic response of the valve to temporary thrust loads in the top link 32. A preferred embodiment of the shock-absorbing means is illustrated in Fig. 8 and the general location thereof in the main casing 42 appears in Fig. 7. Fig. 8 illustrates that the shock absorbing means is in the form of a dash-pot comprising a cylinder 88 preferably formed integrally with the casting structure of the main casing 42. One end of the cylinder is closed by a cast disk 90, held in place by a snap ring 92. A piston 94 is carried in the cylinder 88 and projects at the rear of the cylinder for engagement with an arm 96 keyed to the rockshaft 40 on which the load-control yoke 38 is mounted, it being noted in this respect that the rear portion of the main casing 42 is recessed to accommodate the yoke 38, thus disposing the yoke externally of the casing whereas the rockshaft 40 and the dash-pot-engaging arm 96 is within or enclosed by the casing. The dash-pot piston 94 is biased or loaded in one direction by a coil spring 98 and the piston is movable in the opposite direction and against the bias of the spring 98 by forward swinging of the arm 96 when increased load is applied to the load-control yoke 38. The interior of the main casing 42 serves as a reservoir for the oil or equivalent fluid used in the hydraulic circuit. The dash-pot draws on this fluid for functioning and for this purpose the cylinder 88 includes a fluid port 100 in communication with a bore 102 in an integral annulus 104. A cap 106 threaded into the bore 102 has an intake port 108 that is normally closed by a spring-loaded valve 110. The cap additionally has a restricted outlet orifice 112. In operation, the dash-pot spring 98 constantly urges the dash-pot piston 94 rearwardly or in a direction in opposition to the draft forces imposed on the load-control yoke 38. During movement of the piston in this direction, oil is taken in through the intake port 108, the valve 110 opening to admit the oil. In the event that sudden shock loads are imposed on the top link 32, which loads are transmitted to the yoke 38, the dash-pot piston 94 tends to move forwardly or to the left as viewed in Fig. 8, the piston thus forcing oil from within the cylinder back to the reservoir in the casing 42 via the restricted orifice 112. If the load is sudden and only temporary, the restriction 112 prevents surging of the load-control yoke 38 and consequently no overcorrection is permitted. However, should the load be more than a temporary load, the piston 94 can move slowly, regulated by the amount of oil passing outwardly from the orifice 112, so that proper correction is made. It will be appreciated from the foregoing that minor changes in draft load do not cause undesirable fluctuations in this system as they would without the use of the damping or shock-absorbing means 88—94, since the valve opening in the hydraulic circuit depends upon the amount of movement of the load-control yoke 38 and the movement, with the dash-pot, is controlled, thus obviating major changes in draft linkage position due to major changes in valve position when as a matter of actual practice such position changes are not only unnecessary but are undesirable. The dash-pot also eliminates oscillations and vibrations resulting from the inherent characteristics of the use of a coil spring (here the biasing means 72) as means for balancing or floating at least part of the draft load.

The power lift or power control system comprises, in addition to the main casing 42 and parts contained therein, which will be presently described, an internal valve housing 114 and an external valve housing 116, the expressions "internal" and "external" being used with reference to the locations of the housings 114 and 116 relative to the main casing 42 and relative to an interior compartment 118 formed by the rear tractor part made up of the axle housing 22, which compartment opens at its rear as at 120, the opening being surrounded by an upright mounting surface 122.

The casing 42 has a mounting face 124 which abuts and is secured to the upright mounting surface 122 of the tractor body part 22, means such as a plurality of cap screws 126 being utilized as fasteners.

The casing 42 also has an upright rear mounting face 128 which is abutted by a front upright mounting face 130 of the external valve housing 116. In the event that the external valve housing 116 is not used, the rear face 128 of the main casing 42 is closed by a cover casting 132 (Fig. 13). For the present, it will be assumed that the three-piece power lift casing or housing structure is made up of the components 42, 114 and 116, a description of the details of the cover 132 being reserved until later.

The casing 42, in addition to serving as a fluid reservoir and in addition to rockably supporting the lift rockshaft 54 further contains an integral built-in fluid motor 134, made up of a cylinder 136 and piston 138, and a pressure passage 140 and a motor passage 142. The pressure passage 140 opens at its front and rear ends respectively at the front and rear faces 124 and 128 of the casing 42. The motor passage 142 opens at its front end at the front mounting face 124 and at its rear end communicates with the interior of the motor cylinder 136 by means of a short passage 144.

The pressure source, represented by the pump 70, which has been previously identified, has its low side connected to the reservoir of the casing 42 by means of a suction line 146, the rear end of which is in the form of a flanged coupling 148 secured by cap screws 150 to a portion 152 of the casing 42 that is laterally offset so as to be external as respects the tractor body compartment 118 (Figs. 2 and 7). The high side of the pump 70 is connected to a high-pressure line or conduit 154, the rear end of which has a flanged coupling at 156 with either the external valve housing 116 or the cover plate or casting 132, cap screws 158 being used in either case to permit ready removal and interchangeability. For the present, the details will be omitted and it will be accepted that the high-pressure line 154 ultimately leads to the rear end of the pressure passage 140 in the casing 142.

The casing 42 has an open top normally closed by a removable cover 160, the cover having been removed from Fig. 5 to expose the mechanism within the casing.

The power developed by the fluid motor 134 is transmitted to the lifting rockshaft 54 by means of a piston rod 162 and an internal force-transmitting arm 164. The motor is preferably of the one-way type, exerting a force to rock the rockshaft 54 clockwise for raising the draft linkage 30—32. Descent of the draft linkage is accomplished by gravity. The reservoir connection between the reservoir within the casing 42 and the flanged coupling 148 of the suction line 146 is accomplished by an integral suction or reservoir conduit 166 (Fig. 7).

The valve housing 114 has a rear mounting face 168 which is abutted against and secured to an intermediate portion of the front mounting face 124 of the casing 42, cap screws 170 being utilized as the securing means. The housing 114 is thus located within and projects forwardly into the compartment 118 of the tractor. The valve housing has upper and lower passages 172 and 174 having their rear ends opening at the rear face 168 and respectively in register with the pressure and motor passages 140 and 142 in the casing 42. The forward ends of the passages 172 and 174 are interconnected by a check valve chamber or passage 176. Thus, the composite passage made up by the portions 172, 174 and 176 may be considered as being U-shaped, and control of this passage by valve means, to be presently described, serves to connect and disconnect the pressure and motor passages 140 and 142 in the casing 42.

Control of the passage 172—176—174 is accomplished by valve means including a main control valve 178 and a check valve 180, the check valve working in the check valve passage or chamber and the valve 178 operating in an elongated valve bore 182, the rear end of which opens through an opening 184 in the front wall or face 124 of the casing 42 so that the rear portion of the valve 178 extends into the interior of the casing 42. The U-shaped passage 172—176—174 is interruptible intermediate its ends by means of a differential valve passage 186 under control of a differential valve 188. This differential valve has piston portions 190 and 192 of different effective areas, the larger portion being slidable in a bore 194 and the smaller portion serving to establish and break communication between the passage 186 and a cross passage 196 that leads to a return or exhaust passage 198 in the housing 114. The rear end of the return passage 198 opens at 200 through the front wall or face 124 of the casing 42 and thus leads to the reservoir within that casing.

The right-hand or front end of the valve housing 114 is closed by a removable cover 202 within which is formed a horseshoe-shaped recess 204 that interconnects the front ends of the valve bore 182, the return passage 198 and a safety valve passage 206. The rear end of the safety valve passage is connected to the passage 174 and consequently to the motor passage 142 by means of a short cross passage 208. A spring-loaded safety valve 210, the purpose of which will presently appear, normally closes the front end of the safety valve passage. The control valve bore 182 and the differential valve bore 194 are cross-connected by a short vertical passage 212. The differential valve bore 194 to the rear of the differential valve piston 192 is cross-connected to the return passage 198 by means of a bleed passage 214, which prevents trapping of fluid behind the piston 192.

In Fig. 6, the piston 138 of the hydraulic motor 134 is shown as being at the top of its stroke and the internal control valve member 178 is shown in its position to effect lowering of the piston 138 and consequently lowering of the implement connected to the draft linkage 30—32. Fluid forced out of the cylinder 136 passes through the port or passage 144 and follows the passage 142 to the lower passage 174 in the internal valve housing 114, passing thence through the positively opened check valve 180, through the check valve passage or chamber 176 and to the return passage 198 via the cross passage 196, the differential valve 188 being forced open by the combination of returning fluid and the fluid pressure entering through the high-pressure passage 140—172. In the illustrated position of the control valve 178, the forward or right-hand end, by means of a ramp portion 216, has depressed the stem of the check valve 180 so as to positively open the check valve. The extreme forward or right-hand end of the valve member 178 comprises a cylindrical portion 218 that has a close sliding fit in the valve bore 182, thus preventing the transmission of fluid under pressure through the vertical passage 212 to the differential valve bore 194. Consequently, movement of the differential valve 188 to the right or forwardly is opposed only by a valve-loading spring 220.

It will be assumed for the moment that the internal control valve member 178 is directly under control of the hand lever 60 by mechanism not presently important. Suffice it to say that movement of the lever 60 is reflected in movement of the valve member 178. The neutral position of the valve member 178 is, of course, to the right of that shown in Fig. 6, the valve member moving to such extent as to remove the ramp portion 216 from the upper end of the check valve stem so that the check valve is allowed to seat and therefore to close the check valve passage 176. When the check valve closes, it isolates the motor passage 142—174 from the pressure passage 140—172, thus establishing a fluid or hydraulic lock on the motor 134 and preventing further lowering of the draft linkage and implement. Fluid under pressure from the pump 70 is allowed to circulate substantially freely because such fluid pressure keeps the differential valve 188 open and the incoming fluid passes to the reservoir via the passages 186 and 198. When it is desired to rock the rockshaft 54 in the opposite direction so as to raise the draft linkage and implement, the control lever 60 is moved rearwardly so as to cause further movement of the control valve member 178 to the right, whereupon the cylindrical end portion 218 of the valve member 178 passes to the right of the vertical passage 212 and pressure fluid from the pressure passage 140—172, passing along the stem of the check valve 180, which is fluted at 222, passes along the reduced portion of the valve 178 afforded by the ramp 216 to enter the passage 212 to the right or ahead of the large piston 192 of the differential valve 188. Although the smaller piston 190 of the differential valve is also exposed to fluid under pressure, the difference in areas results in movement of the differential valve to the left, thus closing the passage 186, whereupon the build up of pressure forces the check valve 180 to open and high pressure is transmitted to the cylinder 136 via the motor passage 174—142—144 (the passages being numbered in the order of the direction of fluid pressure flow). When the control valve member 178 is returned to neutral, the check valve again closes and reestablishes the hydraulic lock on the motor 134.

When the implement and draft linkage are raised and are transported over particularly uneven terrain, the tractor wheel or wheels may suddenly drop into a fairly abrupt hole, resulting in the transmission of considerable shock load to the vehicle. In such cases, if the shock load is of sufficient magnitude, the hydraulic lock in the motor 134 is released by automatic opening of the safety valve 210, thus permitting a portion of the hydraulically locked fluid to return to the reservoir from the passages 144—142—174—208—206 and across the horseshoe shaped recess 204 in the internal valve housing cover 202. The regulated escape of the amount of fluid indicated serves to cushion the shock. Because of the follow-up mechanism, to be described below, the original position of the draft linkage and implement is subsequently restored. The invention features the inclusion of the safety valve in a parallel passage along with the other passages in the internal valve housing, the whole being embodied in a unitary construction that is readily assembled to and removed from the front face of the main casing 42, being removable with that casing when the casing is removed from the tractor for repair, adjustment or maintenance. The spring load on the safety valve 210, as represented by a coiled compression spring 224, may be adjusted by means of an adjustable plug 226 to which access may be had by the removal of the end cover 202.

The horseshoe shaped recess 204 in the internal valve housing cover 202 and its relationship to the various passages in the valve housing 114 may be better understood by considering that the recess has an upper central portion 228 that is in alinement with the valve bore 182 and right- and left-hand tail portions 230 and 232 that are respectively in alinement with the safety valve passage 206 and return passage 198.

When the cover casting 132 is used in place of the external valve housing 116, an offset portion 234 on the cover serves as means for receiving the flanged coupling 156 in the high-pressure line 154, the portion 234 being offset laterally of the casing 42 so as to be external thereof and in a position to receive the flanged coupling. The cover casting is internally formed with a continuous passage 236 which connects the high-pressure line 154 to the pressure passage 140 in the casing 42. Thus, a continuous supply of pressure from the pump 70 is afforded via the line 154, passage 236 and supply or pressure passage 140—172 and the communication between this passage and the motor passage 174—142—144 is controlled by the valve means 178—180—188 in the manner previously described. Since the safety valve 210 is designed only to relieve the hydraulic lock between the piston 138 of the motor 134 and the closed check valve 180, it is desirable to use a relief valve in the pressure line somewhere between the pump and the other side of the check valve 180. The general location of a suitable relief valve is indicated at 238 in the cover 132 in Fig. 13. The setting at which the relief valve 238 will open will be, of course, lower than that at which the safety valve 210 will open, for obvious reasons.

When only a single-function power control system is desired, the cover casting 132 will be used and the system will then be self-contained for the control of the internal or built-in motor 134, which is exclusively under control of the valve means in the internal valve housing 114, which valve means is under control of not only the hand lever 60 but of the load-control yoke or member 38 as well as the position of the draft linkage itself. That is to say, there are, as previously explained generally, three factors resulting in control of the internal valve means. Since the functioning of the position-load-responsive phase of the power lift or power control system is broadly independent of the external valve housing, the details of the external valve housing and its components may be postponed. Moreover, the details of the casing, the series operation of the system and the safety valve 210 form the subject matter of assignee's copending application, Serial No. 466,623 filed November 3, 1954, now Patent No. 2,871,963.

Figs. 2 and 7 best show the details of the follow-up linkage that interconnects the internal valve means, the rockshaft 54, the hand lever 60 and the load-control yoke 38. In this respect, it should be noted that the rockshaft 54 is selected as a work member that represents the position of the draft linkage and accordingly of the implement. Any other member movable in response to vertical adjustment of the implement could as well be used. However, the rockshaft in the present case is of specific importance because of its supporting of part of the followup linkage, the details of which will presently appear.

The rockshaft 54 carries thereon arm means made up of a sleeve 240 having integral depending arm parts 242 and 244, the latter of which is bifurcated and pivotally connected at 246 to the rearwardly projecting end of the control valve member 178 of the internal control valve means. The connection at 244—246 is slotted, because movement of the arm is arcuate about the center of the rockshaft 54 whereas movement of the valve member 178 is linear. The arm means does not interfere with the freedom of movement of the valve member 178, since the sleeve portion of the arm means is loosely journaled on the rockshaft 54.

The other arm 242 of the arm means is pivotally connected at 248 to the front end of a rearwardly extending link 250, the rearward end of which is pivotally connected at 252 to the lower end of an equalizer bar 254. The upper end of the equalizer bar is pivotally connected at 256 to the rearward end of a forwardly extending link 258, the front end of which is pivotally connected at 260 to a substantially upright arm 262 formed integral with a collar 264. The collar is rigidly affixed to the rockshaft 54 as by means of a set screw 266. Therefore, movement of the rockshaft 54 is reflected in movement of the arm 262 on the collar 264 and this movement is transmitted through the link 258 to the equalizer bar 254 and through the lower link 250 to the arm means 240—242—244 and thence to the control valve member 178. The equalizer bar is pivoted or fulcrumed intermediate its ends at 268 to a first or upper lever 270 of a pair of levers including a second lever 272 that is pivotally connected to the lower end of the upper or first lever 270 by a pivot 274.

The lower end of the lower lever 272 is fulcrumed at 276 to a lug 278 at the bottom of the main casing 42; and the upper end of the upper or first lever 270 is pivotally connected at 280 to a rearwardly extending link 282 which has its rear end in turn pivotally connected at 284 to a depending arm 286 on an interior portion of the rockshaft 62 for the hand lever 60.

The arm 96, previously described as working in conjunction with the dash-pot 88—94, has an integral second arm portion 288, and a fore-and-aft extending link 290 is pivotally connected at its forward end at 292 to the lower lever 272 and at its rearward end at 294 to the arm portion 288.

The pivotal connections and fulcrum points just described are all adequately designed to afford the necessary freedom of movement for the parts. The pin 246, in addition to establishing a pivotal connection between the arm 244 and the rear end of the valve member 178 serves also as a rear anchor for a coiled tension spring 296, the forward end of which projects into a spring-receiving passage 298 in the internal valve housing 114 via a spring-receiving opening 300 in the front wall or face 124 of the casing 42. The forward end of the spring is appropriately anchored at 302 to a forward portion of the internal valve housing 114, the spring serving as means of substantially uniform bias tending to exert a force on the follow-up linkage to take up the slack therein and consequently to improve the sensitivity pattern of the system, the details of which are not important here since they form the subject matter of assignee's copending application identified above. The numeral 304 in Fig. 4 designates a tapped bore for receiving the anchor 302 for the spring 296.

In the description of Fig. 6 it was noted that the piston 138 is at the upper end of the cylinder 136, resulting in positioning of the draft linkage and implement in a raised or lifted status. The same situation will be taken as obtaining in the following description of the follow-up mechanism, having particular reference to Fig. 7. It will, however, be assumed that the hand lever 60 has been moved forwardly along its sector 66 to initiate lowering of the piston 138. What will be required, then, to halt the descent of the piston 138 will be movement of the valve 178 to its neutral position, which will be a movement to the right, as viewed in Fig. 6, or to the left, as viewed in Fig. 7, which will result in removing the ramp 216 from the stem of the check valve 180 so that the check valve can close under the action of its biasing spring. In the ensuing description, it will be assumed that the valve is being manually restored to its neutral position.

When the hand lever 60 is moved to the rear (clockwise as viewed in Fig. 7; counterclockwise as viewed in Fig. 6), the hand lever rockshaft 62 is accordingly rocked and the arm 286 on that rockshaft swings forwardly to exert a forward force on the upper follow-up lever 270 through the upper link 282. Since the rockshaft 54 is fixed, the pivotal connection at 260 cannot swing about the axis of the rockshaft 54 and accordingly the pivotal connection 256 at the other end of the link 258 becomes a fulcrum. Likewise, since the load-control yoke 38 is fixed, its rockshaft 40 and associated arms 96 and 288 are also fixed. This, through the link 290, fixes the position of the lower follow-up lever 272 and that lever cannot fulcrum about 276. However, the joint 274 serves as a fulcrum so that when the upper link 282 is moved forwardly by the hand lever control arm 286, the upper follow-up lever 270 swings about the fulcrum at 274 and the force is transmitted forwardly through the link 250 to the arm 242. Since this arm is an integral part of the sleeve 240 to which the arm 244 is fixed at 246, the force is ultimately transmitted in a forward direction (to the right in Fig. 6; to the left in Fig. 7) to the control valve 178, thus moving this valve to neutral and allowing the check valve 180 to close.

Let it now be assumed that the operator desires to actuate the motor 134 for the purpose of raising the draft linkage and implement. To do so, he will move the hand lever 60 rearwardly and the various motions just described will again occur to displace the control valve 178 forwardly so that fluid under pressure is supplied through the passage 140—172 to the motor passage 174—142—144. As the piston 138 moves upwardly in the cylinder 136 it rocks the rockshaft 54 clockwise, as viewed in Fig. 6, or counterclockwise, as viewed in Fig. 7. The follow-up linkage is arranged so that movement of the hand lever 60 is proportional to movement of the rockshaft 54, with the result that when the rockshaft 54 attains a certain position the control valve 178 will be automatically returned to neutral. This follows from the fact that as the rockshaft 54 turns, it carries with it the follow-up arm 262, which arm pulls forwardly through the link 258 on the equalizer bar 254. The point 280 now becomes a fulcrum, since the position of the hand lever 60 is now fixed, as is the position of the load-control rockshaft 40. Therefore, the equalizer bar 254 pivots about the pivot point 268 established by the connection of the equalizer bar 254 to the upper follow-up lever 270. As the lower end of the equalizer bar swings to the rear (to the right in Fig. 7), the arm means 240—242—244 is rocked counterclockwise (Fig. 7) and the valve member 178 is restored to neutral.

Restoration of the valve 178 to neutral is accomplished also by movement of the rockshaft 54 following adjustment of the valve as a result of changes in position of the load-control yoke 38 in response to changes in draft forces. For example, assuming that the position of the hand lever 60 determines a plowing position of the plow bottoms 52, it is expected that the plowing operation will be conducted under such circumstances that, theoretically at least, a constant draft load will occur between the tractor and the plow. However, should this draft load increase, the top link 32 will thrust forwardly on the load-control yoke 38, thus rocking the load-control rockshaft 40 clockwise as seen in Fig. 7. The follow-up arm 288 on the load-control rockshaft 40 within the casing 42 will transmit this force forwardly through the link 290 to the lower follow-up lever 272. This lever is fulcrumed at 276, as previously described, and its upper end will swing forwardly, carrying with it the lower end of the upper lever 270, since the two levers are interconnected at 274. Since the position of the rockshaft 54 is fixed, as is the position of the hand lever 60, the upper follow-up lever 270 will fulcrum about the point 280 and the equalizer bar 254 will fulcrum about the point 256. As a consequence, the valve 178 will be moved forwardly from the neutral position to which it had been previously returned in response to attainment by the implement of its predetermined position as selected by the hand lever 60, which position must be now departed from because of the increase in draft load. Therefore, fluid under pressure will be supplied to the motor 134 for the purpose of raising the implement until the draft load reaches the predetermined value for which the hand lever 60 was set. As the implement moves to its new position, it is accompanied, of course, by rocking of the rockshaft 54 which again restores the valve 178 to neutral in the manner explained above. A reverse result will occur when movement of the load-control yoke 38 is in the opposite direction because of lessening of the draft forces.

It will thus be seen that the valve member 178 is under control of the hand lever 60, the rockshaft 54 and the load-control yoke 38. The follow-up linkage is wholly contained in the casing 42 and is therefore not exposed to the hazards of dirt, damage, etc. During all of the changes or adjustment of the valve 138, the slack in the follow-up linkage is taken up by the spring 296 and in addition oscillations and vibrations that might otherwise occur in the linkage are damped out by the dash-pot 88—94, thus giving the dash-pot a function in addition to that previously described in connection with damping of shocks incident to movement of the load-control yoke 38.

The description thus far has proceeded on the basis of the use of the cover casting 132 in place of the external valve housing 116, thus affording a power control system for integrally mounted or drawn implements having adjustable parts receiving adjusting power from the lift arms on the lift rockshaft 54. That is to say, the tractor itself serves as the base from which the lifting power is exerted. However, there are many implements in which adjustment is more readily accomplished by a motor apart or remote from the tractor. One example is the pull-behind combine in which it is conventional to utilize a remote motor for adjusting the header or platform. The desirability of a remote motor is present in many other implements and known power control systems have in the past utilized the remote motor principle.

As shown here and as claimed in the last-mentioned copending application above, the power control system is of the multiple-function type, providing two or more valves, one of which (here 178) controls the internal motor 134, and one or more additional valves, contained in the external valve housing 116, control one or more remote motors, such as the remote motor shown schematically in Fig. 6 at 306 as comprising a cylinder 308 and piston 310. In this adaptation of the instant power control system, the cover casting 132 is removed and is replaced by the external valve housing 116 as shown best in Figs. 2, 6 and 7.

The housing 116, as previously described, has a front mounting face 130 which abuts and is secured to the rear mounting face 128 of the main casing 42. A forward portion of the external valve housing 116, as at 312, is laterally offset from the main casing 42 so as to afford a connection for the flanged coupling 156 of the high-pressure or pump line 154 (Fig. 2). The housing 116 therefore has a fluid inlet passage 314 and further has an exhaust or outlet passage 316 which, when the housing 116 is mounted on the rear face of the casing 42, is in register with the pressure passage 140 in the casing. Disregarding for the moment the presence of valve mechanism in the housing 116, it will be recognized that the housing 116 serves as a conduit for the transmission of fluid pressure from the high-pressure line 154 to the internal valve housing 114 via the pressure passage 140 in the casing 42, from which the interchangeability of the housing 116 and cover casting 132 will be appreciated. In short, what the housing 116 does is to interpose one or more independent valves in the circuit between the pump and the internal valve 178, and the interposed valves are in series with the valve 178.

In the present case, there are two such valves for controlling two remote motors such as the motor 306 but, since these are duplicates, only one will be described in detail.

The external valve housing 116 has therein an upright valve bore 318 in which a spool-type valve member 320 is slidable for controlling the inlet and outlet passages 314 and 316 as well as upper and lower motor passages 322 and 324. The passages 322 and 324 are additionally controlled respectively by upper and lower check valves 326 and 328 and male coupling parts 330 and 332 are adapted to be connected by motor lines 334 and 336 respectively to opposite ends of the cylinder 308 of the remote motor 306. When the remote motor 306 is not used, the coupling parts 330 and 332 may be capped as shown at 338 and 340 in Fig. 1. The inlet 314 has upper and lower branches 342 and 344 connectible respectively to the motor passages 322 and 324, depending upon the direction of displacement of the valve member 320. Upper and lower exhaust grooves 346 and 348 surround the valve bore 318 in axially spaced relation to each other and lead to the outlet 316. These are also selectively connectible to the motor passages 322 and 324, depending upon the direction of movement of the valve member. The valve member 320 is controlled by a rockshaft 350 which is internally connected by an arm 352 and pin 354 to the upper end of the valve member and which is externally connected to a hand lever 356 that is additional to and independent of the previously described hand lever 60.

When the external valve member 320 is in its neutral position, as shown in Fig. 6, fluid from the high-pressure line flows through the casing pressure passage 140 via 314, 344, 348 and 316, a portion 358 of the valve bore 318 serving to connect the inlet branch 344 to the lower exhaust annulus or groove 348. Hence, control of the internal motor 134 by the internal valve member 178 can occur as described above. When the valve member 178 is also in its neutral position, the pump pressure is circulated to the reservoir in the casing 42 via the internal valve housing return or exhaust passages 186, 196 and 198.

The external valve housing 116 is closed at its top and bottom respectively by covers 360 and 362. The top cover has been removed from the housing 116 in Fig. 2, wherein it will be seen that the housing carries a second valve member 364 which is a duplicate of the valve member 320 and which controls appropriate passages including motor outlets having upper and lower coupling parts 366 and 368 (Fig. 7). The bore in which the valve member 364 operates receives its fluid pressure from an inlet (not shown) that is connected in series with the exhaust annulus 348 in the valve bore 318, so that when the valve member 320 is in its neutral position, pressure fluid flows from 348 through a passage system duplicating that for the valve member 320 before flowing out through the outlet 316 and thence through the casing motor passage 140, it being understood that the valves 320, 364 and 178 are in series in the order named.

The control rockshaft 350 for the valve member 320 is tubular (Fig. 6) and a second valve control rockshaft 370 passes loosely through the tubular rockshaft 350 to carry at its inner end an arm 372 for effecting vertical displacement of the valve member 364. A second manual lever 374 is fixed to the outer end of the rockshaft 370, thereby affording independent control of the valve members 320 and 364.

A general understanding of the series arrangement between the valve bores for the valve members 320 and 364 may be obtained from the dotted-line showing in Fig. 2, wherein the inlet 314 is visible as leading to the valve 320 and the outlet 316 is shown as leading from the valve member 364. The view also shows an interconnecting passage 376 between the two valves. Also visible in Fig. 2 is an upper check valve 378 for the upper motor outlet 366 of the second pair 366 and 368.

When the valve member 320 is displaced in one direction or the other to supply fluid to one end or the other of the remote motor 306, fluid returning from the other end of that motor follows the associated exhaust passage and flows thence across the passage 376 and is available for controlling a second remote motor connected to the motor outlets 366 and 368 or may be led directly to the internal valve housing 114, depending upon whether or not the second valve 364 is in neutral or active position. The fluid may then be directed to the reservoir in the casing 42 or may be used to extend the motor 134, depending upon whether the internal valve member 178 is in neutral or in active position. If, in the preceding description, the valve member 364 were in active position, the fluid returning from the opposite end of the remote motor controlled thereby would be conveyed in any event to the internal valve housing 114 via the casing motor passage 140. The end result in any case is that the fluid, whether or not used by either or both of the valve members 320 and 364, ultimately traverses the casing 42 via the internal motor passage 140 and leads to the internal valve housing 114 and ends ultimately in the reservoir in the casing 42. The system accordingly affords wide flexibility of use, in the present instance enabling the use of a pair of remote cylinders along with the use of the internal cylinder 134. Since any of the valves may be operated independently or simultaneously, the system is admirably adapted for its multiple-function operation, and use of one or the other of the three valves does not mean that the user must sacrifice the operation of another of the valves, as in the prior art.

There is a basic difference between the types and operation of the valve members 178 and 320, for example. The valve member 178 depends for positioning upon selective setting of the control lever 60, and is automatically returned to neutral by the follow-up linkage (Fig. 7) previously explained. On the other hand, the valve 320 has a neutral position (as shown in Fig. 6) and first and second or upper and lower active positions to either of which it may be forcibly moved by rocking of the tubular rockshaft 350 via the hand lever 356, but the valve member 320 is biased for return to its neutral position by yielding centering means designated generally by the numeral 378. This means comprises a coil spring 380 acting against upper and lower washers 382 and 384 through which a lower extension 386 of the valve member 320 is slidable. Thus, if the valve member 320 is moved downwardly and the operator releases the lever 356, the centering means 378 will tend to return the valve to neutral. The same will occur after the valve member is moved upwardly and the operator releases the lever 356. A duplicate centering means (not shown) is provided for the other valve member 364, but a detailed disclosure thereof would be a repetition of the disclosure of the centering means 378.

It is conventional in valves of the general type represented by the valve member 320 to provide some form of means for retaining the valve member in either of its active positions, and it is also conventional to utilize some form of means, responsive to excess pressure in the circuit, to automatically return the valve to its neutral position. Such means, albeit in modified and novel form, is used here and will be referred to broadly as detent means 388. A second detent means 390 is provided for the other valve member 364 (Fig. 10) but again duplicate disclosure in detail will be avoided, except as to minor differences that may exist.

The portion of the control valve member 320 just above the centering means 378 has formed therein upper and lower detent-receiving grooves 392 and 394, either of which, depending upon the position of the valve member 320, is adapted to receive and be releasably locked by a detent pin 396 rigid on a detent piston 398 contained within a detent chamber 400. The detent pin 396 projects through an opening 402 in the wall portion of the valve housing 116 that separates the detent chamber 400 from the valve bore 318, and the rear end of the chamber 400 is closed by a removable plug 404 between which and the piston 398 is seated a spring 406 that constantly urges the piston 398 and detent element 396 forwardly or to the right as viewed in Fig. 6 so that the detent pin or element is always ready for engagement with either of the grooves 392 or 394. These grooves are spaced axially apart a considerable distance, allowing for movement of the valve member 320 in opposite directions through a predetermined range without causing engagement of the detent means with one or the other of the detent grooves 392 or 394. Thus, the operator is able to utilize the valve member 320 for slow speed operation or for operation through relatively short periods without effecting a lock-up of the valve. However, for faster speeds and longer periods of operation, he can move the valve member an additional distance to effect establishment of the functioning of the detent means. Because of the shape of the grooves 392 and 394 and the end of the detent pin 396, the detent may be released by forcible movement of the valve member 320 so that the operator may return it to neutral. However, the present design features improved means for automatically effecting return of the valve member 320 to its neutral position from either of its active positions. This means, forming the subject matter of copending application Ser. No. 542,449, filed October 24, 1955, now Patent No. 2,844,166, and to be described in detail below, utilizes hydraulic release of the detent means 388 so that the centering means 378 becomes effective to restore the valve member to its neutral position.

The lower portion of the external valve housing 116 includes a relief passage 408 having its inlet end connected by a short passage 410 to the inlet branch 344 and further having its outlet end, at 412, opening through an opening 414 in the rear wall or face 128 of the casing 42, thus communicating with the interior reservoir formed in that casing. The inlet end of the relief conduit has a first relief valve 416 in the form of a ball seating on a seat insert 418 and loaded by a coiled compression spring 420 so that the reservoir conduit is normally blocked off from the pressure fluid in the inlet line 314—344. A portion of the relief conduit 408 adjacent to its exhaust or outlet end 412 is chambered at 422 and contains a second relief valve in the form of a ball 424 biased by a spring 426 against a seat insert 428 to normally separate the main portion of the relief conduit 408 from its outlet 412. The second relief valve or ball 424 is downstream of and in series with the first relief valve or ball 416. The spring 426 is somewhat lighter than the spring 420, being set to permit the ball 424 to open at, for example, a pressure of one hundred p.s.i., whereas the spring 420 permits the ball 416 to open at a pressure of, for example, eleven hundred p.s.i.

Considered to the extent just described, the first relief valve 416 will open in response to pressures in excess of eleven hundred pounds and since the second relief valve 424 opens at the much lower pressure the excess pressure will be diverted to the reservoir in the casing 42 via the outlet 412 and casing wall opening 414. However, according to the present invention a portion of this excess fluid pressure is utilized to release the detent means 388 so that the valve member 320 may be returned from its active position to its neutral position. For this purpose, a detent passage 430 leads off from the relief conduit 408 intermediate the ends of that conduit and is connected to the detent chamber 400 ahead of the detent piston 398, thus being capable of supplying to the detent chamber fluid under pressure to that side of the piston 398 in opposition to the bias imparted by the detent spring 406. The use of only a portion of the excess pressure to actuate the detent means 388 is preferable to subjecting the piston 398 to the full pressure. This means that the pressure on the detent means will always be uniform, consistent with the bias in the spring 426, the advantages of which will be obvious without elaboration.

A bleed 432 leads off from the relief conduit intermediate the relief valves 416 and 424 to prevent the entrapment of fluid in the relief conduit. A bleed 434 leads off from the detent chamber 388 behind the piston 398 so as to prevent the trapping of fluid in that portion of the detent chamber. This bleed leads to a recess 436 in the bottom cover 362 for the external valve housing 116, which recess is connected in any suitable manner to the reservoir in the casing 42. This recess also prevents the accumulation of fluid in the chamber in which the centering means 378 is located as well as in the chamber that carries the first relief valve spring 420.

Figure 10:
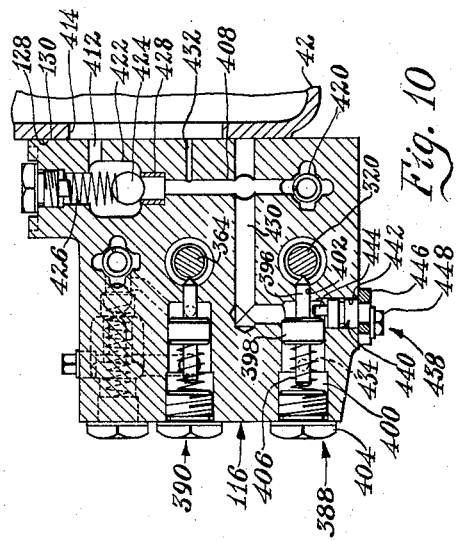
Fig. 10 is a sectional view as seen substantially along the line 10—10 of Fig. 9.

Visible in Fig. 10 are portions of the second detent means 390 and portions of a second relief conduit and associated passages for controlling that detent. Since these function in a manner similar to those just described for the detent 388, repetition is deemed unnecessary.

It is considered that the operation of the hydraulic release of the detent will be clear from the foregoing description and accordingly only a brief outline of that operation will be covered here. If the valve member 320 is moved upwardly to one of its active positions, the detent pin 396 will become releasably engaged with the lower detent groove 394, and the detent spring 406 will retain the detent function as long as some external force is not applied to the valve member 320, either by the operator or by the hydraulic detent release means. The force applied by the operator through the operating lever 356 is sufficient to overcome the effect of the detent means and as soon as the detent pin 396 is released from the detent groove 394, the centering means 378 will restore the valve member 320 to neutral. In those instances in which automatic restoration of the valve member 320 to neutral is effected, the pressure rise in the passage 410 will, when it attains a predetermined value, open the first relief valve 416 and the relief conduit flow will pass to the reservoir via the relief conduit outlet 412, opposed only by the relatively light setting of the second relief valve 424 which functions to divert part of the relief flow to the front of the detent chamber 398 so as to withdraw the detent pin 396 from engagement with the detent groove 394, it being understood, of course, that the pin 396 is carried in the detent chamber opening 402 for extension and retraction respectively into and out of engagement with the associated detent-receiving portion or groove in the valve member 320. Again, the centering means 378 functions to return the valve member 320 to neutral. The same result follows regardless of the active position in which the valve member 320 is set. When the pressure falls to normal, the valves 416 and 424 close and the system functions as before.

Figure 9:
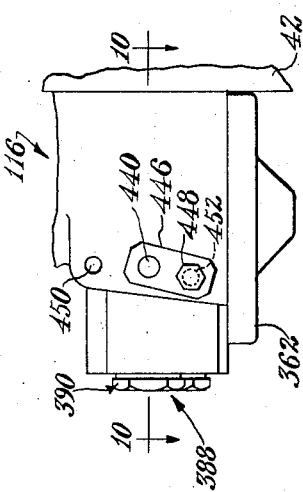
Fig. 9 is an elevational view of the lower portion of the external valve housing at the left-hand end or rear of Fig. 6.

It is a feature of the present invention to provide means for selectively nullifying the effects of the detent means 388. That portion of the external valve housing 116 that forms the detent chamber 388 serves as support means for a lock element designated generally by the numeral 438. This element comprises a bi-positionable rockshaft 440 carried in a bore 442 that intersects the front portion of the detent chamber 388. The inner end of the lock rockshaft 442 has means thereon in the form of an eccentric 444 which engages the front face of the piston 398. The external end of the rockshaft 442 has secured thereto means for selectively fixing the rockshaft in either one of two positions angularly related about the rockshaft axis. This means comprises an arm 446 having one end apertured to receive a cap screw 448. The external side of the valve housing has a pair of spaced tapped bores 450 and 452, either one of which may receive the cap screw 448. As shown in Fig. 9, the cap screw 448 passes through the arm 446 and is threaded into the lower tapped bore 452, thus positioning the rockshaft in such manner that its eccentric 444 is in a forward position, which affords unlimited travel to the piston 398 and the detent means will function as described above for the purpose of locking and releasing the valve member 320. However, when the cap screw 448 is removed and the arm is rotated to a position in which the cap screw can be passed through the arm and threaded into the upper tapped bore 450, the eccentric 444 is moved rearwardly and thus forcibly retracts the piston 398, and consequently the detent pin or element 396, so that the pin is withdrawn from engaging relationship to the detent-receiving portions or grooves 392 and 394 of the valve member 320. In the form of the invention illustrated, there is no lock-out means 438 for the other detent means 390; however, such lock-out means could readily be provided if desired.

The operation of the various components of the system has been described in connection with the description of the structure. The over-all operational characteristics of the inventive design disclosed here can be gathered from the individual functions ascribed to the parts and accordingly need not be elaborated. Features of the invention not categorically described will undoubtedly occur to those versed in the art, as will many modifications and alterations in the preferred embodiment of the invention as presented here, all of which may be achieved without departing from the spirit and scope of the invention.

What is claimed is:

1. In a tractor having vertically adjustable draft linkage connectible to an agricultural implement and power means for raising, lowering and supporting the linkage, the combination of control means connected to the power means and selectively operative to activate and deactivate said power means; a draft-actuated member carried by the tractor and connectible to the implement for movement back and forth in accordance with changes in draft forces between the tractor and implement; means interconnecting said member and the control means for causing the control means to activate and deactivate the power means in response to movement of said member; yielding biasing means acting between the tractor and the draft-actuated member and substantially balanced against a draft force of a predetermined value for immobilizing said member, said biasing means yielding in response to draft forces of a greater value to enable movement of said member to cause activation of the power means by the control means; and said biasing means comprising a first, relatively soft spring and a second, relatively stiff spring operative in parallel against the draft-actuated member, said stiff spring having a lost-motion connection between the tractor and said member so that movement of said member in an initial range is opposed exclusively by the soft spring and subsequent movement of said member is opposed by both springs.

2. The invention defined in claim 1, in which: the soft spring is composed of coils of relatively large diameter and has opposite ends supported respectively by the tractor and the draft-actuated member, and the stiff spring is composed of coils of smaller diameter contained within the coils of the soft spring.

3. The invention defined in claim 1, including: shock-absorbing means separate from the biasing means and interposed between the tractor and the draft-actuated member for damping shock loads applied to the draft-actuated member in the direction incurring yielding of the biasing means.

4. In a tractor having vertically adjustable draft means connectible to an agricultural implement, the combination of a rockshaft carried by the tractor and connected to the draft means; a fluid motor carried by the tractor and connected to the rockshaft; a control valve selectively movable between neutral and active positions to respectively deactivate and activate the motor for respectively immobilizing and rocking the rockshaft; a control member manually settable on the tractor in any one of several positions; a draft-actuated member connectible to the implement and shiftable against biasing means on the tractor in accordance with changes in draft load on the draft means; and control linkage for effecting positioning and repositioning of the valve in response to movement of any one of the control member, the rockshaft and the draft-actuated member, comprising first arm means journaled on and projecting generally radially from the rockshaft and connected to the valve, second arm means fixed to the rockshaft and extending therefrom generally diametrically as respects the first arm means, an equalizer bar having opposite ends pivotally connected respectively to the first and second arm means, a first lever fulcrumed intermediate its ends on an intermediate portion of the equalizer bar and having one end pivotally connected to the control member, a second lever having one end pivotally connected to the other end of the first lever and its other end fulcrumed on the tractor, and means pivotally connecting the second lever intermediate its ends to the draft-actuated member.

5. The invention defined in claim 4, in which: the equalizer bar is spaced from the valve in a direction lengthwise of the rockshaft, the first arm means includes a sleeve journaled on the rockshaft and having at one end an arm part alined with and connected to the valve and at its other end another arm part alined with and connected to the equalizer bar; and said second arm means is at the end of the sleeve adjacent to the equalizer bar.

6. The invention defined in claim 4, in which: the draft-actuated member includes a rockable part having a first rigid arm portion connectible to the implement, a second rigid arm part connected to the second lever, and a third rigid arm part, and shock-absorbing means is carried by the tractor and engaged by said third rigid arm part.

7. In a tractor having vertically adjustable draft means connectible to an agricultural implement, the combination of a rockshaft carried by the tractor and connected to the draft means; a fluid motor carried by the tractor and connected to the rockshaft; a control valve selectively movable between neutral and active positions to respectively deactivate and activate the motor for respectively immobilizing and rocking the rockshaft; a control member manually settable on the tractor in any one of several positions; a draft-actuated member connectible to the implement and shiftable against biasing means on the tractor in accordance with changes in draft load on the draft means; and control linkage for effecting positioning and repositioning of the valve in response to movement of any one of the control member, the rockshaft and the draft-actuated member, comprising first radial arm means journaled on the tractor coaxially with the rockshaft and connected to the valve, second arm means fixed to the rockshaft and extending therefrom generally diametrically as respects the first arm means, an equalizer bar having opposite ends pivotally connected respectively to the first and second arm means, a pair of levers pivotally interconnected at proximate ends by a pivot joint and having one remote end fulcrumed on the tractor and the other remote end pivotally connected to the control member, one lever of said pair being fulcrumed between one remote end and the pivot joint on the intermediate portion of the equalizer bar and the other lever of said pair being pivotally connected between the other remote end and said pivot joint to the draft-actuated member.

8. In a tractor having vertically adjustable draft linkage connectible to an agricultural implement and power means for raising, lowering and supporting the linkage, the combination of control means connected to the power means and selectively operative to activate and deactivate said power means; a draft-actuated member carried by the tractor and connectible to the implement for movement back and forth in accordance with changes in draft forces between the tractor and implement; means interconnecting said member and the control means for causing the control means to activate and deactivate the power means in response to movement of said member; yielding biasing means acting between the tractor and the draft-actuated member and substantially balanced against a draft force of a predetermined value for immobilizing said member, said biasing means yielding in response to draft forces of different values to enable movement of said member to cause activation of the power means by the control means; and shock-absorbing means separate from the biasing means and interposed between the tractor and the draft-actuated member in parallel with said biasing means for damping oscillation of the biasing means when draft forces are applied to the draft-actuated member and for preventing momentary changes in draft force from actuating said member.

9. The invention defined in claim 8, in which: the power means is fluid-pressure operated and the tractor includes a housing forming an internal fluid reservoir; and the shock-absorbing means is located within the housing and comprises a dash-pot having a fluid intake and a restricted fluid outlet in communication with the reservoir.

10. In a tractor having housing structure providing a compartment, vertically adjustable draft linkage connectible to an agricultural implement and power means for raising, lowering, and supporting the linkage, the combination of control means connected to the power means and selectively operative to activate and deactivate said power means; a draft-actuated member comprising a rockshaft carried by the housing structure and having an outer portion connectible to the implement to incur rocking of the rockshaft in accordance with changes in draft forces between the tractor and implement; means interconnecting the rockshaft and the control means for causing the control means to activate and deactivate the power means in response to rocking of said rockshaft, said rockshaft including an inner portion within the compartment; and shock-absorbing means located within the compartment and interposed between the tractor and the rockshaft for damping shock loads applied to the rockshaft by draft forces.

References Cited in the file of this patent

UNITED STATES PATENTS

| | | |
|---|---|---|
| 2,405,980 | Sands et al. | Aug. 20, 1946 |
| 2,440,550 | Martin | Apr. 27, 1948 |
| 2,460,847 | Schwarz | Feb. 8, 1949 |
| 2,572,705 | Edman | Oct. 23, 1951 |
| 2,689,585 | Presnell | Sept. 21, 1954 |
| 2,764,923 | Morgen | Oct. 2, 1956 |